Patented Jan. 15, 1952

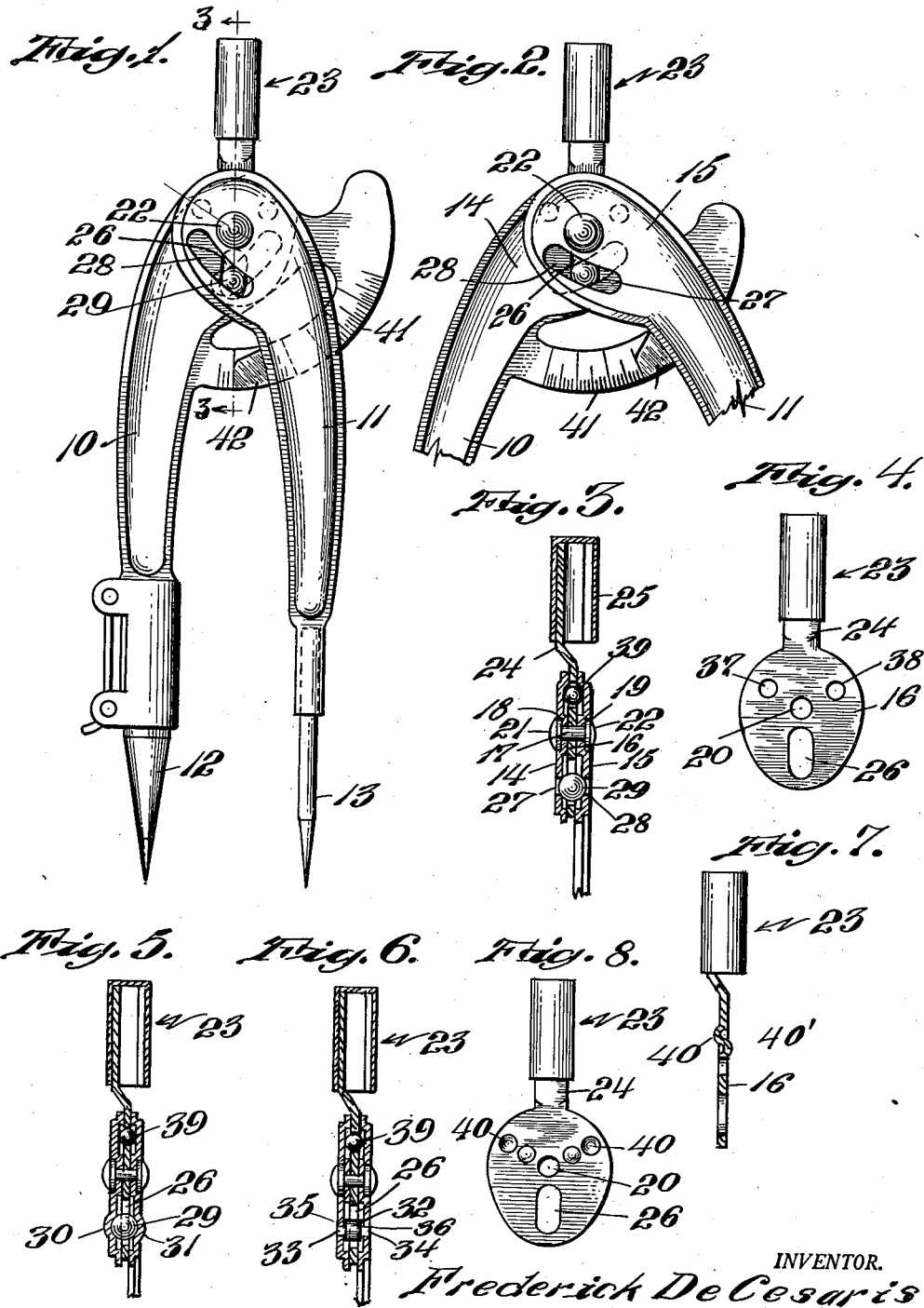

2,582,585

UNITED STATES PATENT OFFICE 2,582,585

COMPASS

Frederick De Cesaris, Johnston, R. I., assignor to James Manufacturing Co., Inc., a corporation Application March 20, 1947, Serial No. 735,839

11 Claims. (Cl. 33—149)

1

This invention relates to a compass of the type which is usually furnished to school children in order to assist them to draw a true circle.

Heretofore, school compasses have been manufactured rather inexpensively consisting of a pair of legs which are pivoted together with a handle extending upwardly from a leaf located between two leg positions at the pivot. An arrangement has been provided for maintaining this handle in a line which will bisect the angle between the two legs as the legs are moved toward and from each other. To accomplish this result, a slot has been provided in the leaf on which the handle is mounted and slots have been provided in each of the legs with a pin extending through said slot and headed at its ends. The pin must be somewhat loose, but even when loose, there is exerted a considerable friction by reason of the edges of the three slots in which the pin moves as the parts swing about their pivot.

One of the objects of this invention is to provide a compass in which the means for maintaining the handle vertical will operate with a minimum amount of friction and thus permit of the movement of the legs toward and from each other with a small amount of effort.

Another object of this invention is to provide a minimum amount of friction for movement of the parts which will enable the parts to be better adjusted that the spacing of the ends of the legs may be more accurately positioned.

Another object of this invention is to provide a better balanced arrangement of support of the leaf and the legs at either side so that the surfaces may be better supported as they move about the pivotal axis upon which they are mounted.

With these and other objects in view, the invention consists of certain novel features of construction as will be more fully described and particularly pointed out in the appended claims.

In the accompanying drawings:

Fig. 1 is a plan view of the compasses embodying my invention;

Fig. 2 is a fragmental view similar to Fig. 1, but illustrating the legs of the compass in a different position;

Fig. 3 is a sectional view on the zigzag line 3—3 of Fig. 1 to show the relationship of the pivot and the ball held in the leaf and between the legs;

Fig. 4 is a plan view of the leaf and handle as shown in Fig. 3;

Fig. 5 is a view similar to Fig. 3, but illustrating a modified form of leg and ball arrangement;

Fig. 6 is a sectional view similar to Fig. 3, but showing a further modification;

Fig. 7 is a sectional view of the leaf alone showing an offset as a point of engagement for balancing the mounting of the leaf position;

Fig. 8 is a plan view of the structure of Fig. 7.

In proceeding with this invention, instead of providing a rivet through slots in the legs and the leaf, I have provided a ball or roller in this position which will turn upon an axis within itself and roll along the surfaces which act as cams for the relative movement of the parts. By this arrangement, it is not necessary that slots be formed, but the stock may be pressed out to form a groove, thus covering completely this actuating part which was heretofore exposed. Further, in order that the ball may be balanced on the other side of the pivot as to its spacing of the leg members, I have provided other balls or equivalent parts to engage the legs and provide an equal spacing of the legs at other points about the pivotal mounting.

With reference to the drawings, 10 designates one leg member and 11 the other leg member. These leg members are formed of sheet stock which is offset or ribbed to stiffen the same. A pencil 12 is provided in one leg and a steel point 13 in the other leg as is usual in compasses of this character. The upper ends of these legs are formed in broadened head portions 14 and 15, each of sheet stock, so that there is a considerable portion of one overlying a corresponding portion of the other, and between these two head portions 14 and 15 a leaf or piece of sheet stock 16 (see Fig. 4) is located which is of a size to compare to the size of these heads 14 and 15 between which it is located. A pivot pin 17 extends through opening 18 in the head 14, 19 in the head 15 and 20 in the leaf 16. This pivot is headed over as at 21 and 22 so that it may be retained in place. The heads on the pin are of such distance apart that they do not tightly bind the parts, but permit of their relative free movement. A handle designated generally 23 extends from the leaf 16 and consists of an arm 24 having a cylindrical tube 25 secured thereon by a tight friction engagement.

As the leg members 10 and 11 are relatively moved about the pivot pin to space the points 12 and 13 different distances apart, it is desired that the handle 23 be maintained in a line which will bisect the angle distance between the legs 10 and 11 so that this handle will always be in a position to be clasped by the user for swinging the pencil about the point 13 as a center. In order that this may be accomplished, a slot 26 is located in the leaf 16 with its axis extending radial to the opening 20 and with its opposite side walls parallel to this axis, the axis of this slot being located in a line which is in line with the handle 23 as is seen clearly in Fig. 4. A slot 27 is provided in the member 14, and a slot 28 is provided in the member 15, each of these slots providing camming edges and each of the slots being similarly but oppositely directed with relation to the pivot so that they will cross the radial slot 26 in the leaf. I position a spherical member or ball 29 in these three slots, the slot 26 being of a size to accommodate the ball freely therethrough, whereas the slots 27 and 28 are of a much smaller size, as shown in Fig. 3, which will receive a part of the ball but will not permit the ball to pass therethrough. By this arrangement, as the ball must remain in the slot 26 and also partially in each of the other slots, relative movement of the leg members 10 and 11 will cause the ball to move up and down in the slot 26 and will maintain the leaf member 16 with its handle in a line which will bisect the angle formed between the leg members 10 and 11 at the pivot.

In some cases, instead of providing slots as 27 and 28, the stock of the heads 14 and 15 may be deflected outwardly as at 30 and 31 (see Fig. 5) so as to provide grooves which will be of the same shape as the slots but will not be formed by cutting the stock completely through. In this case, the ball 29 will act as heretofore in the slot 26 of the leaf, but the ball will be hidden from view by reason of the groove instead of the slot.

In Fig. 6, I have illustrated a still different form in which instead of using a ball I have used a cylindrical roll 32 which is located in the slot 26 and has its reduced ends 33 and 34 in slots 35 and 36 which will compare with slots 27 and 28 except they will be of somewhat narrower width. The action, however, will be similar except that the roll will turn about one axis instead of about any axis within itself which might occur where the ball was utilized.

The constructions of ball or roller which I have heretofore described will serve to space the sheet stock heads 14 and 15 at a point below the pivot 22 as it is illustrated in the various veiws. In order to provide a support and spacer at the other location about the pivot, I form openings 37 and 38 which are arranged at 120° apart and at 120° from the slot 26, thus providing a three point relationship for provision of a support for these parts, and in each of these openings 37 and 38, I locate a ball 39 (see Fig. 3) which will be of a size equal to the distance that these heads 14 and 15 are spaced apart by the ball 29 below the pivot 17. This also provides a ball bearing for the leaf in its movement relative to the heads 14 and 15 of the legs 10 and 11.

In some cases, however, instead of providing an opening with a ball therein as just described, I may offset the stock of the leaf 16 as at 40 on one side and 40' on the other side (see Fig. 7) so that the structure will engage and provide a point of contact with the head 14 or the head 15.

In addition to the relationship of the leaf with its opposite heads, I provide an arcuate scale 41 formed as one piece with the leg 11 to move over the graduations on this arcuate scale and show the different positions to which the leg members 10 and 11 have been relatively moved.

I claim:

1. A compass comprising, a pair of leg members having portions overlying each other with a leaf having a handle extending therefrom located between said overlying portions, a pivot pin extending through said members and leaf to pivotally relate said members and means to maintain said handle in a position the line of which bisects the angle formed between said legs as movement about said pivot occurs comprising a radial slot in said leaf, similarly oppositely positioned camming surfaces crossing said slot and a member having circular cross section in said slot and engaging said camming surfaces and freely rotatable about a plurality of axes within itself.

2. A compass as in claim 1 wherein said member in said slot is provided with a curved outer surface which will roll along the surfaces contacted.

3. A compass as in claim 1 wherein said member in said slot is a ball.

4. A compass as in claim 1 wherein said cam surfaces are formed by grooves in said leg members.

5. A compass as in claim 1 wherein said cam surfaces are formed by slots in said members.

6. A compass comprising, a pair of leg members having portions overlying each other with a leaf having a handle extending therefrom located between said overlying portions, a pivot pin extending through said members and leaf to pivotally relate said members and means to maintain said handle in a position the line of which bisects the angle formed between said legs as movement about said pivot occurs comprising a radial slot in said leaf, similarly oppositely positioned camming surfaces crossing said slot and a member having circular cross section in said slot and engaging said camming surfaces and freely rotatable about a plurality of axes within itself wherein the member in said slot is of a size to space said leg members and the leaf is provided, on the side of the pivot away from said slot, with means to space said leg members a distance substantially that provided by the member in said slot.

7. A compass as in claim 6 wherein said spacing means is symmetrically arranged with respect to said slot in said leaf.

8. A compass as in claim 6 wherein said spacing means comprise an offset in said leaf.

9. A compass as in claim 6 wherein said spacing means comprise a ball held in position by a formation in said leaf.

10. A compass as in claim 6 wherein said spacing means comprise a ball held in position in an opening in said leaf.

11. A compass comprising a flat body member, a sleeve having an extension carried thereby and disposed at one end of said body member, a point provided on the extension, a pivot on the opposite end of the body member, an arcuate channel in the body adjacent said pivot and said channel opening outwardly to form an arcuate slot, a ball bearing in said arcuate slot, a handle having a bore therein for pivotable mounting on the pivot of said body member, a longitudinal slot in said handle for movable engagement with said ball bearing, a scriber having one end thereof arcuate with an arcuate passage in said arcuate end for engagement with said ball bearing, an eyelet in the arcuate end of said scriber for pivotable connection with the pivot of the body member whereby movement of said scriber will coactingly move said handle.

FREDERICK DE CESARIS.

REFERENCES CITED

The following references are of record in the file of this patent:

UNITED STATES PATENTS

| Number | Name | Date |
|---|---|---|
| 730,388 | Oberbeck | June 9, 1903 |
| 844,772 | Bernegau | Feb. 19, 1907 |
| 902,257 | Schoenner | Oct. 27, 1908 |
| 1,343,664 | Dieckman | June 15, 1920 |
| 2,080,917 | Hockman | May 18, 1937 |
| 2,187,519 | Meilner | Jan. 16, 1940 |

FOREIGN PATENTS

| Number | Country | Date |
|---|---|---|
| 7,008 | Great Britain | Mar. 26, 1903 |
| 7,431 | Switzerland | Oct. 20, 1893 |
| 88,764 | Germany | 1896 |
| 169,495 | Germany | Apr. 10, 1906 |
| 207,383 | Great Britain | Nov. 29, 1923 |
| 266,888 | Germany | Nov. 4, 1913 |